United States Patent
Chang

(10) Patent No.: US 11,784,893 B1
(45) Date of Patent: Oct. 10, 2023

(54) CHANNELIZED OPTICAL WAVELENGTH DIVISION MULTIPLEXING (WDM) ADAPTIVE INTERFACE

(71) Applicant: VeEX Inc., Fremont, CA (US)

(72) Inventor: Paul Chang, Fremont, CA (US)

(73) Assignee: VeEX Inc., Fremont, CA (US)

( * ) Notice: Subject to any disclaimer, the term of this patent is extended or adjusted under 35 U.S.C. 154(b) by 0 days.

(21) Appl. No.: 17/229,633

(22) Filed: Apr. 13, 2021

(51) Int. Cl.
*G06F 3/048* (2013.01)
*H04L 41/22* (2022.01)
*H04J 14/02* (2006.01)
*G06F 3/0482* (2013.01)

(52) U.S. Cl.
CPC ............ *H04L 41/22* (2013.01); *G06F 3/0482* (2013.01); *H04J 14/0227* (2013.01)

(58) Field of Classification Search
None
See application file for complete search history.

(56) References Cited

U.S. PATENT DOCUMENTS

| | | | |
|---|---|---|---|
| 7,124,368 B1* | 10/2006 | Subramanian | H04L 43/062 715/736 |
| 10,613,711 B1* | 4/2020 | Makovsky | G06F 11/3409 |
| 2007/0299830 A1* | 12/2007 | Muenchhoff | G06F 16/9577 |
| 2013/0283318 A1* | 10/2013 | Wannamaker | H04N 21/4314 725/56 |
| 2014/0129911 A1* | 5/2014 | Kiefer | G06F 16/9577 715/204 |
| 2015/0095787 A1* | 4/2015 | Bhaskara | H04L 41/0896 715/735 |
| 2017/0353243 A1* | 12/2017 | Brueckheimer | H04B 10/0793 |

* cited by examiner

*Primary Examiner* — Thanh T Vu
(74) *Attorney, Agent, or Firm* — Sheppard Mullin Richter & Hampton LLP

(57) ABSTRACT

A number of channels on an optical network is determined by a device. A size of a display through which a user interface is to be provided is determined. A number of tiles to be included in the user interface is determined based on the number of channels and the size of the display. Each tile is associated with a channel. The user interface including the number of tiles is caused to be provided through the display.

20 Claims, 13 Drawing Sheets

1100

1102 Determine a number of channels on an optical network

1104 Determine a size of a display through which a user interface is to be provided

1106 Determine a number of tiles to be included in the user interface based on the number of channels and the size of the display, wherein each tile is associated with a channel

1108 Cause the user interface including the number of tiles to be provided through the display

CHANNELIZED OPTICAL WAVELENGTH DIVISION MULTIPLEXING (WDM) ADAPTIVE INTERFACE

FIELD OF THE INVENTION

The present technology relates to optical networks. More particularly, the present technology relates to an adaptive interface for channelized optical wavelength division multiplexing (WDM).

BACKGROUND

Optical networks are an important part of modern network infrastructure. Because signaling in optical networks is based on light (e.g., laser), optical networks can have a much higher data throughput than copper-based networks. Furthermore, latency associated with optical networks can be much lower than latency of copper-based networks. An optical network, such as a fiber optic network, can include a plurality of fiber optic cables. An optical fiber of a fiber optic cable can have its ends coupled to a cascade of optical multiplexers and optical demultiplexers. An optical multiplexer can multiplex various wavelengths of light into a multiplexed light signal that can be transmitted through an optical fiber with each wavelength of light carrying data corresponding to a particular channel of an optical network. An optical demultiplexer can demultiplex a multiplexed light signal received through an optical fiber to recover constituent wavelengths of light.

SUMMARY

Various embodiments of the present technology can include methods, systems, non-transitory computer readable media configured to determine, by a device, a number of channels on an optical network. A size of a display through which a user interface is to be provided is determined. A number of tiles to be included in the user interface is determined based on the number of channels and the size of the display. Each tile is associated with a channel. The user interface including the number of tiles is caused to be provided through the display.

In some embodiments, each tile is associated with a CWDM channel or a DWDM channel.

In some embodiments, a size for each tile is determined such that arrangement of the number of tiles in the user interface occupies the area of the user interface based on a threshold value.

In some embodiments, the tiles are the same size.

In some embodiments, a first tile associated with a first type of channel has a first size and a second tile associated with a second type of channel has a second size different from the first size.

In some embodiments, the user interface includes a tile having stylization, the stylization including a color to indicate a status of a channel associated with the tile, the status associated with a power level range into which a power level value of the channel falls.

In some embodiments, the user interface includes a tile having stylization, the stylization including a color to indicate a band to which the channel belongs.

In some embodiments, in response to selection of a tile included in the user interface, channel information about a channel associated with the tile is provided in a second user interface, the channel information including at least one of a channel identification, wavelength, frequency, current power, maximum power, minimum power, average power, or a status of the channel.

In some embodiments, the determining a number of tiles to be included in the user interface is further based on a configuration selected by an operator of the device.

In some embodiments, the display is associated with the device or a second device in communication with the device.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 11 illustrates an example method, according to various embodiments of the present technology.

Figure 1:
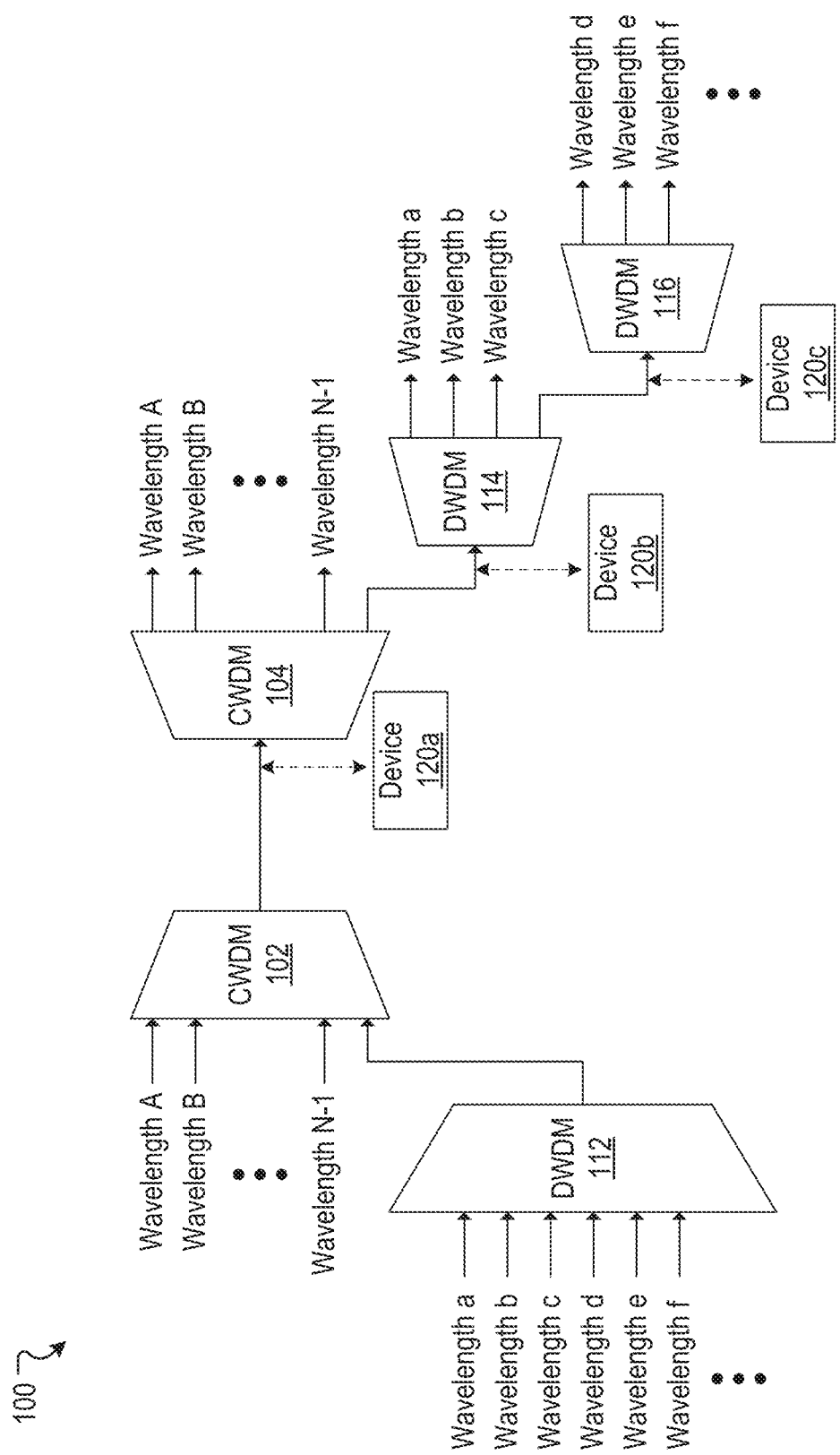
FIG. 1 illustrates an example optical network, according to various embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Identifying Fast Frequency Multiplexed Optical Network Channels

Optical networks are an important part of modern network infrastructure. Because signaling in optical networks is based on light (e.g., laser), optical networks can have a much higher data throughput than copper-based networks. Furthermore, latency associated with optical networks can be much lower than latency of copper-based networks. An optical network, such as a fiber optic network, can include a plurality of fiber optic cables. An optical fiber of a fiber optic cable can have its ends coupled to a cascade of optical multiplexers and optical demultiplexers. An optical multiplexer can multiplex various wavelengths of light into a multiplexed light signal that can be transmitted through an optical fiber with each wavelength of light carrying data corresponding to a particular channel of an optical network. An optical demultiplexer can demultiplex a multiplexed light signal received through an optical fiber to recover constituent wavelengths of light.

Conventional devices can be used by field personnel to measure and monitor power levels of channels of an optical network. The devices can include, for example, optical channel checkers and multiple channel power meters. The devices can be coupled to an optical network through, for example, a fiber patch cord of a patch panel to determine power levels of channels of the optical network. The channels correspond to certain wavelengths (or frequencies) of light. The channels can include channels of coarse wavelength division multiplexers (CWDMs) and channels of dense wavelength division multiplexers (DWDMs) of the optical network. In some instances, the amount of CWDM channels and DWDM channels of an optical network can number in the hundreds or more. Conventional devices can measure power level information of all CWDM channels and DWDM channels of the optical network.

Conventional devices can include interfaces through which field personnel can attempt to monitor the many channels of an optical network. In conventional devices, the interfaces display certain types of information about the optical network. The types of information can include identifications of channels of the optical network, a frequency or wavelength of light associated with each channel, and information about a power level associated with each channel. Such information can allow field personnel to assess power levels of particular channels and the overall health of the optical network. The interfaces of conventional devices should be capable of conveying such information for potentially hundreds of channels of an optical network in a clear and efficient manner.

Unfortunately, however, the design and operation of conventional devices and their interfaces are suboptimal in myriad respects and engender many disadvantages specifically arising in the realm of computer technology. One type of conventional interface presents information in a table format or view. In the table format, information can be provided in a page (or screen) having a fixed number of rows and a fixed number of columns. For example, each row may correspond to a particular channel of an optical network, and a first column may indicate a channel identifier of the channel, a second column may indicate a wavelength (or frequency) of the channel, and a third column may indicate a power level of the channel. The fixed number of rows and the fixed number of columns in the table format can limit the amount of channel information provided through a page and degrade user experience with the page. Often, the fixed number of rows displayable on a page is a small fraction of the total number of channels of the optical network that are monitorable by the conventional device. For example, a page configured in a table format may only list seven channels. Accordingly, field personnel must arduously scroll page-by-page to see additional information about the entirety of the channels of the optical network. Further, if information about a particular channel of interest is not on a page being currently presented, field personnel are forced to painstakingly scroll page-by-page forward or backward until information about the channel of interest is found. On the other hand, if the total number of channels is less than the fixed number of rows in the table format, channel information provided on the page can appear unnecessarily small and occupy only a small portion of the page.

Another type of conventional interface presents information in a graphical format or view. In the graphical format, information can be provided in a fixed number of rows or a fixed number of columns. For example, when the graphical format is associated with a fixed number of rows, each row corresponds with a particular channel of an optical network and provides a graphical indication of a power level of the channel. The graphical indication of the power level can be presented as a horizontally oriented bar with a length in proportion to a power level of the channel. A graphical format associated with a fixed number of columns can be analogous to a graphical format associated with a fixed number of rows, except the former may represent channels as columns and accordingly present bars in a vertical orientation. Like the table format, the graphical format is disadvantageous at least because of the relatively small amount of channel information that can be presented on a page in view of the potentially large total number of channels of the optical network. The small amount of channel information displayable in a page necessitates cumbersome, time-consuming manual interaction with the device (e.g., scrolling commands) before a complete understanding of the optical network can be achieved.

Yet another type of conventional interface presents information in a grid format or view. In the grid format, information can be provided in a static grid constituting a large rectangle (or square) presented on a page. The large rectangle is divided into smaller rectangular (or square) elements of the same size. Each element can correspond to a particular channel of an optical network and provide information about the channel, such as channel number and power level. The grid has fixed dimensions. For example, a grid having fixed dimensions of 3×5 has 15 elements (i.e., 3×5=15) of the same size, with each element associated with one channel. Accordingly, a page configured in the grid format contains information about a number of channels that cannot exceed the number of elements in the grid. Typically, like the table format and the graphical format, the number of channels presented on a page configured in a grid format is a fraction of the total number of channels for which the device can provide information. Accordingly, the grid format also necessitates extensive user interaction with a device before desired information can be presented. Field personnel may be required to tediously scroll through multiple pages of channel information before information about all channels can be assessed or information about a particular channel of interest finally appears. Further, side-by-side comparison of power level information for different channels may be impossible when the channels are dispersed over disparate pages. One possible approach to attempt to address these problems is to shrink the size of elements to squeeze more elements in a grid. However, shrinking the elements, in turn, could require a reduction in the font size of text appearing in each element, which at some degree would render the text difficult to read or altogether unreadable. These and other shortcomings are compounded when a page configured in a grid format is presented through a display of a conventional device with a relatively compact form factor.

An improved approach rooted in computer technology overcomes the foregoing and other disadvantages associated with conventional approaches specifically arising in the realm of computer technology. Based on computer technology, the present technology provides a device configured to generate an adaptive user interface to be presented through a device that dynamically tiles channel information of an optical network. The adaptive user interface enables efficient assessment of operating conditions of the optical network and provides enhanced user experience for an operator of the device. Each tile presented through the adaptive interface can be associated with a corresponding channel of the optical network. The tiles can provide various types of information about the optical network, such as identification of channels of coarse wavelength division multiplexers (CWDMs) and dense wavelength division multiplexers (DWDMs) as well as power level information for the channels.

Based on the present technology, the tiles of the adaptive user interface can be dynamically arranged and sized. The number of tiles in the adaptive user interface and the size of the tiles can vary based on the number of channels of the optical network and a size of a display through which the tiles are to be presented. In addition, the number of tiles and the size of the tiles can be based on configurations selected by an operator of the device. The appearance of the tiles can be varied and stylized to convey different information. A tile can be color coded to indicate a particular power level status of an associated channel. Tiles can be sized differently to indicate types of their associated channels, such as a CWDM channel type or a DWDM channel type. A tile can be color coded to indicate a type of an associated channel or a particular band in which the associated channel is grouped, or both. When a tile is selected, the adaptive user interface can provide more information about an associated channel than was presented in the tile. The adaptive user interface can be presented through a display of a device connected to an optical network, such as a field meter. The adaptive user interface also can be presented through a display of a computing device (e.g., a tablet, laptop, smartphone, etc.) that is in communication with the device. These and other inventive features of the present technology are discussed in more detail below.

FIG. 1 illustrates an example optical network 100, according to various embodiments of the present technology. In some embodiments, the optical network 100 can be a fiber optic network. The optical network 100 can have one or more transmitting ends and one or more receiving ends. Signals associated with the optical network 100 can travel from a transmitting end to a receiving end. Although the optical network 100 of FIG. 1 shows signals traveling unidirectionally, in some embodiments, the optical network 100 can be configured such that signals travel bidirectionally. In such embodiments, the ends of the optical network 100 can both transmit and receive signals. As shown in FIG. 1, in some embodiments, the optical network 100 can comprise wavelength division multiplexers (WDMs), such as coarse wavelength division multiplexers (CWDMs) 102, 104 and dense wavelength division multiplexers (DWDMs) 112, 114, 116. A WDM can be configured as a multiplexer or a demultiplexer. When a WDM is configured as a multiplexer, the WDM can multiplex (combine) one or more wavelengths of light into a multiplexed light signal. When a WDM is configured as a demultiplexer, the WDM can demultiplex (segregate) a multiplexed light signal into its constituent wavelengths of light. In general, multiplexing can improve channel bandwidth utilization of optical assets. When multiplexing is used, a fiber optic cable can carry multiple wavelengths of light (e.g., multiple data signals) as a single multiplexed light signal, thereby increasing channel bandwidth utilization (e.g., data throughput) of the fiber optic cable. Whether a WDM is classified as a CWDM or a DWDM generally depends on a number of channels (e.g., wavelengths of light) the WDM is capable of multiplexing or demultiplexing. In many cases, a CWDM can multiplex or demultiplex upwards of 18 channels, while a DWDM can multiplex or demultiplex upwards of 90 channels. In some cases, the CWDM can multiplex or demultiplex more or less than 18 channels. Likewise, in other cases, the DWDM can multiplex or demultiplex more or less than 90 channels. Many variations are contemplated.

WDMs associated with a transmitting end of the optical network 100 can be configured as multiplexers (e.g., the CWDM 102 and the DWDM 112) and WDMs associated with the receiving end of the optical network 100 can be configured as demultiplexers (e.g., the CWDM 104 and the DWDMs 114, 116). In this way, various wavelengths of light can be multiplexed into a multiplexed light signal and transmitted from a transmitting end. When the multiplexed light signal reaches a receiving end, the multiplexed light signal can be demultiplexed to its constituent wavelengths of light. In some cases, the transmitting end of the optical network 100 can be associated with a single location or site, while the receiving end can be associated with multiple locations or sites. For example, the transmitting end can be associated with a network service provider (e.g., an internet service provider) at a site providing network services (e.g. internet services) and the receiving end can be associated with switch boxes (e.g., DWDM drops) located at various locations or sites through which the network services are distributed. As shown, as just one example, a transmitting end can comprise at least the DWDM 112 through which channels carrying network services are multiplexed to generate a multiplexed light signal, while a receiving end can comprise multiple DWDM drops (e.g., DWDM 114, DWDM 116). Each DWDM drop can be associated with a location. A portion of the channels of the multiplexed light signal can be demultiplexed at each DWDM drop so that the network services can be distributed to, for example, households at a location associated with the DWDM drop.

In some embodiments, one or more DWDMs can be coupled to a CWDM to further increase channel bandwidth utilization of a fiber optic cable. In general, a group of wavelengths of light multiplexed by a CWDM can operate at different frequencies than another group of wavelengths of light multiplexed by a DWDM. Thus, the two groups of wavelengths of light can be simultaneously carried by a fiber optic cable without interference. For example, in some embodiments, a CWDM can multiplex wavelengths of light that range from 1270 nanometers (nm) to 1470 nm, and a DWDM can multiplex wavelengths of light that range from 1528.77 nm to 1563.86 nm. As such, in this example, because there is no wavelength (frequency) overlap between the two groups of wavelengths of light, multiplexed light signals generated by the CWDM and the DWDM can be simultaneously transmitted through a fiber optic cable, thereby increasing channel bandwidth utilization of the fiber optic cable. As such, the total number of channels carried on a fiber optic cable of the optical network 100 can be potentially very large given the number of channels associated with CWDMs and the number of channels associated with DWDMs. While FIG. 1 depicts an example configuration of the optical network 100 for purposes of illustration, the present technology applies to an optical network having any number, combination, or configuration of DWDMs and CWDMs and any number of DWDM channels and CWDM channels.

A device 120 can be communicatively coupled to the optical network 100 to measure or determine information about channels, such as DWDM channels and CWDM channels, of the optical network 100. The information can include, for example, identification of a channel, a wavelength or frequency of the channel, and a power level of the channel. The device 120 can be any suitable device for determining such information about DWDM channels and CWDM channels of the optical network 100. In one example, the device 120 can be an optical channel checker, a multiple channel power meter, a tester, or other equipment with similar functionality. As shown, the device 120, which is illustrated in various instances as devices 120*a*, 120*b*, 120*c*, can be coupled to the optical network 100 at various locations. A fiber patch cord or other suitable coupling device can be used to connect the device 120 to the optical network 100. For example, the device 120*a* can be coupled to the optical network 100 just before the CWDM 104 to measure all of the wavelengths of the multiplexed light signal that is output by the CWDM 102. The device 120*b* can be coupled to the optical network 100 just before the DWDM 114 to measure some of the wavelengths of the multiplexed light signal that is output by the DWDM 112. The device 120*c* can be coupled to the optical network 100 just before the DWDM 116 to measure a remainder of the wavelengths of the multiplexed light signal that is output by the DWDM 112.

Figure 2A:
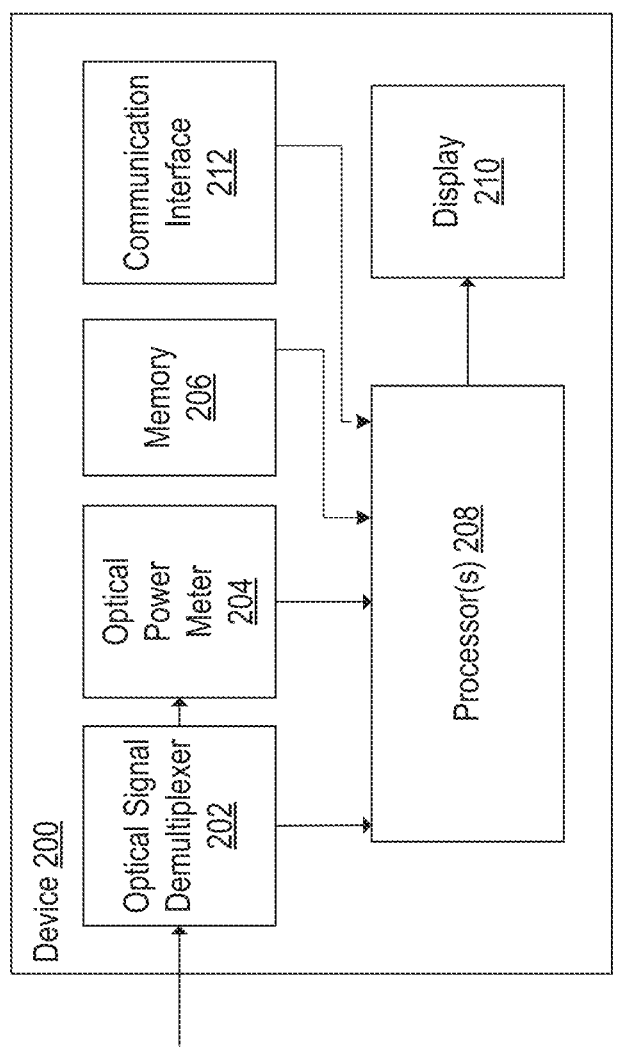
FIG. 2A illustrates an example device, according to various embodiments of the present technology.

FIG. 2A illustrates an example device 200, according to various embodiments of the present technology. In some embodiments, the device 200 can be used to implement the device 120. As discussed above, the device 200 can be coupled to an optical network to measure channels of the optical network and enable generation of an adaptive user interface that can provide channel information to an operator of the device 200. In some embodiments, the device 200 can include an optical signal demultiplexer 202, an optical power meter 204, a memory 206, one or more processors 208, a display 210, and a communications interface 212. The optical signal demultiplexer 202 can receive a multiplexed light signal of an optical network and demultiplex the light signal into its constituent wavelengths of light or channels. The optical signal demultiplexer 202 can identify and separate the channels by their corresponding wavelengths. The optical power meter 204 can be coupled to the optical signal demultiplexer 202. The optical power meter 204 can measure an optical power level of each channel. The optical power level of a channel can be used to determine other information relating to the channel, as described in more detail herein. The memory 206 can store information, such as identifications of channels and measured optical power levels of each channel. The memory 206 also can store instructions for performing operations in connection with the processor(s) 208 to generate adaptive user interfaces that provide channel information about the optical network and to otherwise carry out the functionality of the present technology as described herein. The operations performed based on the stored instructions are discussed in more detail herein. The adaptive user interfaces can be presented through a display, such as the display 210 or displays of secondary devices in communication with the device 200. The display 210 can be, for example, an LCD display or screen (e.g., touch screen) through which an operator of the device 200 can access information and interact with the device 200. The communications interface 212 can be configured to support and enable communications between the device 200 and secondary devices, as discussed in more detail below. The components (e.g., modules, elements, blocks, functions, etc.) shown in this figure and all figures herein are exemplary only, and other implementations may include additional, fewer, integrated, or different components. Some components may not be shown so as not to obscure relevant details.

Figure 3:
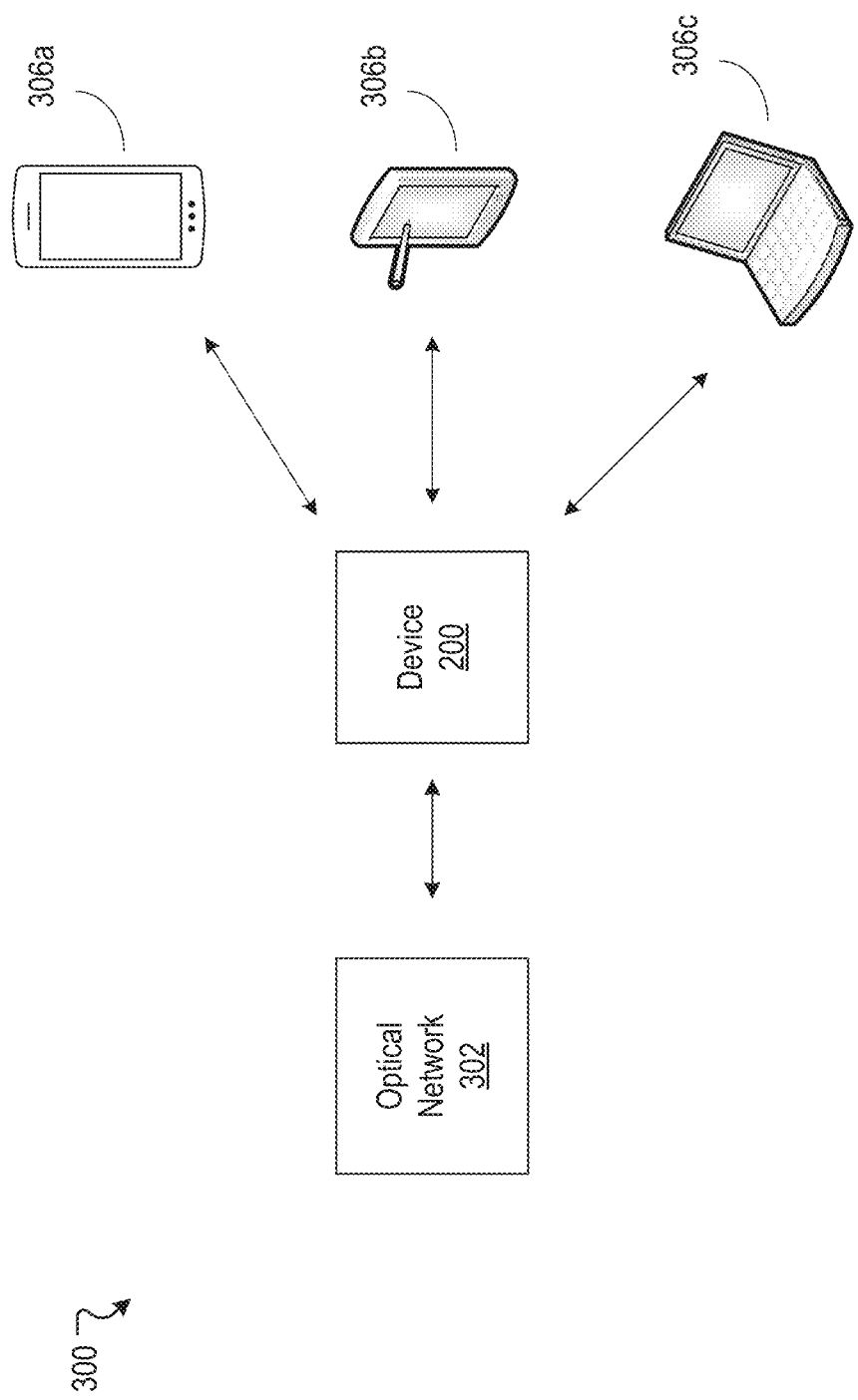
FIG. 3 illustrates an example communications environment of a device, according to various embodiments of the present technology.
Figure 4:
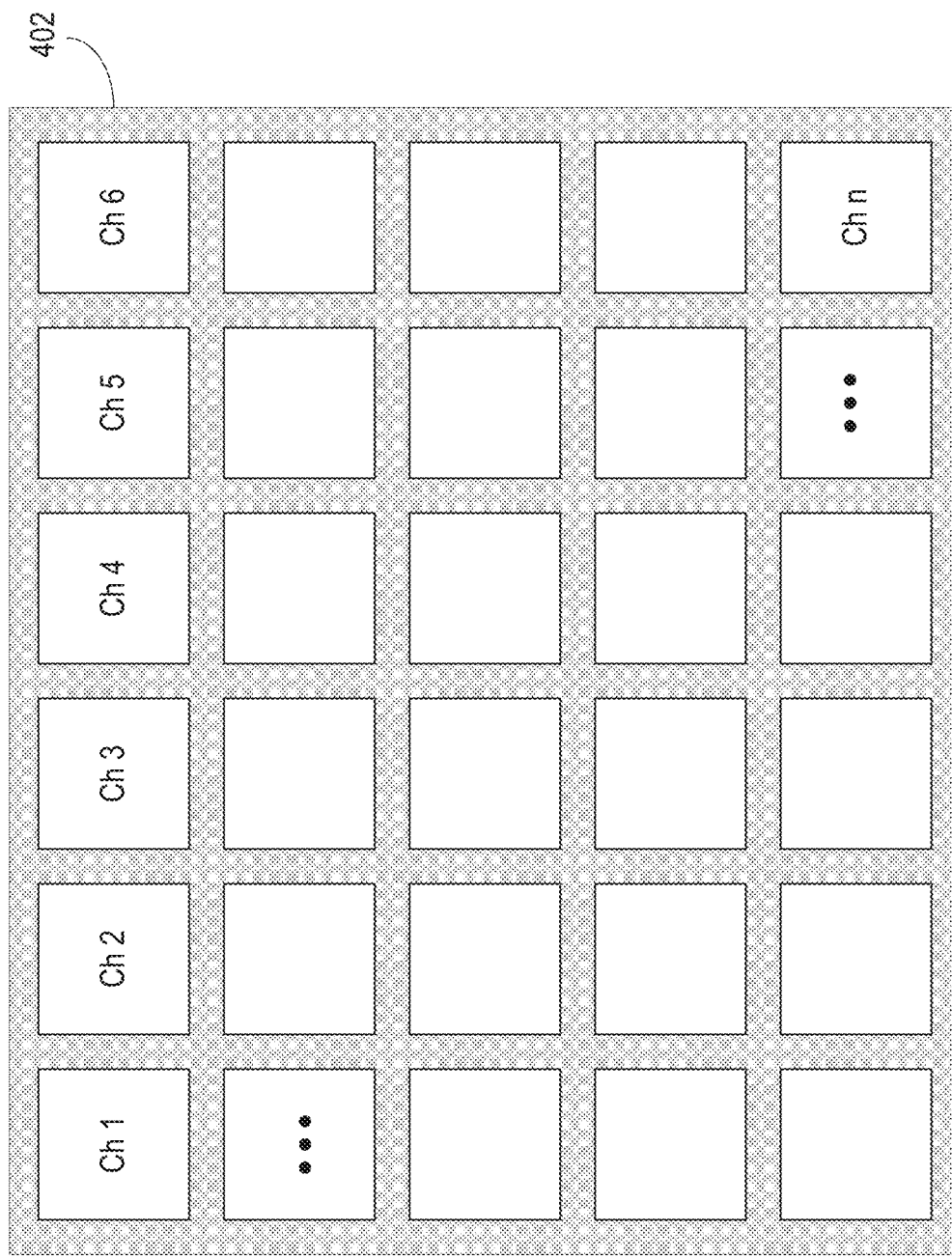
FIGS. 4-10 illustrate example adaptive user interfaces, according to various embodiments of the present technology.

FIG. 3 illustrates an example communications environment 300 including the device 200, according to various embodiments of the present technology. The communications environment 300 includes an optical network 302 and secondary devices 306*a*, 306*b*, 306*c* to which the device 200 can be communicatively coupled. As discussed, the device 200 can be coupled to the optical network 302 through any suitable connection, such as a fiber patch cord. The secondary devices 306*a*, 306*b*, 306*c* can be any computing device or other equipment. In the illustration shown, the secondary device 306*a* is a smartphone, the secondary device 306*b* is a tablet computer, and the secondary device 306*c* is a laptop computer. Other types of secondary devices having displays are possible. The communications interface 212 of the device 200 can support bidirectional wired or wireless communications with the secondary devices 306*a*, 306*b*, 306*c* through a suitable communications protocol. For example, the communications protocol can be Bluetooth, Wi-Fi, Internet, NFC, or any other appropriate protocol that can support local or remote communications between the device 200 and any of the secondary devices 306*a*, 306*b*, 306*c*. Through the communications interface 212, the device 200 can receive information from and provide information to the secondary devices 306*a*, 306*b*, 306*c*. For example, the device 200 can receive information about the secondary devices 306*a*, 306*b*, 306*c*, such as a size of their respective displays. The communications interface 212 can cause presentation of adaptive user interfaces that provide channel information about the optical network 302 through the displays of the secondary devices 306*a*, 306*b*, 306*c*. The adaptive user interfaces can be generated and customized for each of the secondary devices 306*a*, 306*b*, 306*c*, as discussed below. The communications interface 212 also allows the device 200 to receive user interactions associated with adaptive user interfaces presented through the displays of the secondary devices 306*a*, 306*b*, 306*c* so that information responsive to the user interactions can be provided by the device 200. The secondary devices 306*a*, 306*b*, 306*c* can be operated by the same entity (e.g., person, organization) that is operating the device 200 or by an entity that is different from the entity that is operating the device 200.

Figure 2B:
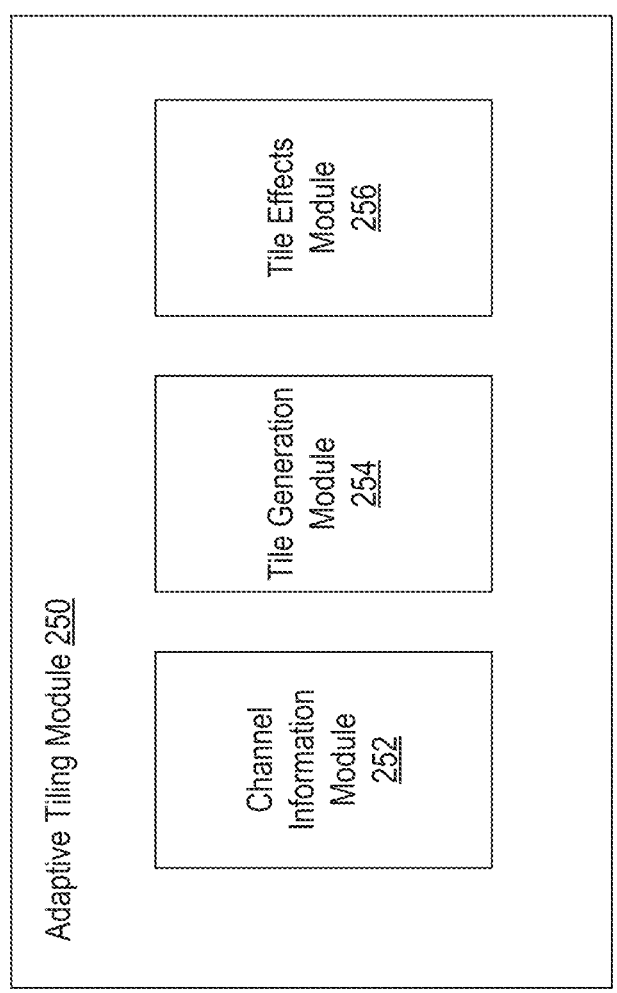
FIG. 2B illustrates an example adaptive tiling module, according to various embodiments of the present technology.

FIG. 2B illustrates an example an adaptive tiling module 250, according to various embodiments of the present technology. The adaptive tiling module 250 can generate adaptive user interfaces that provide channel information about an optical network. As discussed, the adaptive tiling module 250 can generate adaptive user interfaces in the display 210 or a display of a secondary device in communication with the device 200, or both simultaneously, as discussed in more detail below. The functionality of the adaptive tiling module 250 as discussed herein can be based on instructions stored in the memory 206. As shown, the adaptive tiling module 250 can include a channel information module 252, a tile generation module 254, and a tile effects module 256. Again, the components shown in this figure and all figures herein are exemplary only. Other implementations may include additional, fewer, integrated, or different components. Some components may not be shown so as not to obscure relevant details.

The channel information module 252 can be configured to determine various types of channel information for generation of adaptive user interfaces. The various types of channel information can be selectively included in adaptive user interfaces. The channel information module 252 can determine various characterizations of channels, such as DWDM channels and CWDM channels. For example, the channel information module 252 can identify or associate a channel with a channel number according to a channel numbering system (e.g., ITU channel), an associated wavelength, or an associated frequency. As another example, the channel information module 252 can determine a band to which the channel belongs. For example, the channel information module 252 can associate a channel with a C band (approx. 1525-1565 nm), an L band (approx. 1570-1610 nm), or another band (e.g., U band, S band, E band, etc.). The channel information module 252 also can determine various power level metrics relating to a channel. For example, the channel information module 252 can determine current power, maximum power, minimum power, and average power for a channel. These power level metrics can be based on optical power levels measured by the optical power meter 204 and stored in the memory 206.

The channel information module 252 also can determine a status associated with a power level of a channel. The status can be based on a value of a power level associated with the channel. The value of the power level can be compared with a plurality of selected power level ranges. Each power level range in the plurality of power level ranges can be associated with a particular status. A channel having a power level can be associated with a particular status when the value of the power level falls within the power level range associated with the particular status. As just one example, a first power level range can be power level values below a first threshold value, a second power level range can be power level values equal to or greater than the first threshold value and less than a second threshold value, a third power level range can be power level values equal to or greater than the second threshold value and less a third threshold value, and a fourth power level range can be power level values equal to or greater than the third threshold value. The number of power level ranges, the number of thresholds, and the threshold values are configurable, and can be selected by, for example, an operator of the device 200. In one implementation, the first threshold value, the second threshold value, and the third threshold value can be, respectively, −45 dBm, −28 dBm, and −24 dBm. These threshold values are merely examples, and other threshold values can be selected in other implementations. Each power level range can be associated with a status. For example, the first power level range can be associated with a status indicating that no signal is detected, the second power level range can be associated with a status indicating a poor power level, the third power level range can be associated with a status indicating an acceptable power level, and the fourth power level range can be associated with a status indicating a good power level. For example, the first power level range, the second power level range, the third power level range, and the fourth power level range can be associated with color coding, such as white, red, yellow, and green, respectively. In other implementations, other power level ranges can be associated with other types of color coding. Many variations are possible.

The tile generation module 254 can be configured to generate adaptive user interfaces having tiles based on channel information of an optical network. An adaptive user interface can be presented through a display for review by an operator of a device, such as the device 200 or a secondary device in communication with the device 200. Adaptive user interfaces can be generated and customized for presentation through the display 210 or a display of a secondary device, or both simultaneously. Each tile in a user interface can be associated with a channel of the optical network. The tile generation module 254 can receive information about the number of channels detected by the device 200. The tile generation module 254 also can receive information about the size or dimensions of a display, such as the display 210 of the device 200 or a display of any secondary device in communication with the device 200. In some embodiments, based on the number of channels and the size of a display, the tile generation module 254 can adaptively determine an arrangement of tiles to be included in a user interface. The arrangement can relate to a number of tiles and sizes of tiles to be included in the user interface. In some embodiments, a number of tiles and sizes of tiles to be included in a user interface can be configurable as determined by, for example, an operator of the device 200. For example, the operator may choose a selected number of tiles, a selected size for each tile, or both. In some embodiments, a tile can have a rectangular or square shape. In other embodiments, a tile can have other shapes or a combination of shapes.

The number of tiles in an adaptive user interface as determined by the tile generation module 254 can dynamically change. In some embodiments, the adaptive user interface generated by the tile generation module 254 does not have fixed positions defined by a fixed number of rows or a fixed number of columns into which tiles are located. Rather, the adaptive user interface generated by the tile generation module 254 can have a variable number of tiles. In various embodiments, the number of tiles to be included in a user interface can equal the number of channels detected on an optical network in a particular instance. For example, if a first number of channels are detected at a first location of the optical network (e.g., a WDM drop), the tile generation module 254 can generate an adaptive user interface including a number of tiles equal to the first number of channels. If a second number of channels different from the first number of channels are detected at a second location of the optical network, the tile generation module 254 can generate an adaptive user interface including a number of tiles equal to the second number of channels. As another example, if a first number of channels are detected on the optical network at a first time, the tile generation module 254 can generate an adaptive user interface including a number of tiles equal to the first number of channels. If a second number of channels different from the first number of channels are detected on the optical network at a second time, the tile generation module 254 can generate an adaptive user interface including a number of tiles equal to the second number of channels.

The tile generation module 254 can generate an adaptive user interface to include a tile for each channel detected by the device 200. The title generation module 254 can determine a size for each tile such that arrangement of all tiles in the user interface occupy substantially all of the area of the user interface (or a designated portion of the user interface). For example, a size of each tile can be determined such that all tiles in the user interface in total occupy a certain threshold percentage of the area of the user interface (e.g., 95% of the area of the user interface is occupied by tiles). The value of the threshold percentage can be configurable. In some embodiments, the tile generation module 254 can determine a size of a tile subject to a threshold tile size. The tile generation module 254 can apply the threshold tile size so that the size of a tile in a user interface satisfies (e.g., does not fall below) the threshold tile size. In some cases, the threshold tile size can ensure that each tile or information appearing in each tile remains large enough to be visible or legible to an operator of the device 200 or a secondary device. The threshold tile size can be configurable based on various factors, such as contemporaneous operator preference, historical configurations, or an attribute of an operator (e.g., visual acuity). If a page (or screen) of a user interface cannot contain tiles associated with all of the channels detected by the device 200, the tile generation module 254 can generate additional pages of the user interface to include tiles associated with remaining channels.

In some embodiments, the tile generation module 254 can generate adaptive user interfaces to reflect channel information of an optical network through the display 210 of the device 200 and a display of a secondary device in communication with the device 200. The tile generation module 254 can generate the adaptive user interfaces for the two devices simultaneously (or successively). Each adaptive user interface for a particular device can be customized for the device based on the functionality of the adaptive tiling module 250 as discussed herein. For example, a first device, such as the device 200, can have a display having a first size and a second device, such as a secondary device in communication with the device 200, can have a display having a second size that is larger than the first size. In this example, the tile generation module 254 can generate and customize adaptive user interfaces conveying the same channel information for the first device and the second device. For instance, based on the different display sizes, the adaptive user interface for the first device can include tiles that are smaller in size than the tiles included in the adaptive user interface for the second device. In some cases, the adaptive user interface for the first device and the adaptive user interface for the second device can include the same number of tiles. In other cases, the adaptive user interface for the first device and the adaptive user interface for the second device can include different numbers of tiles.

FIGS. 4-10 illustrate examples of adaptive user interfaces that can be generated by the adaptive tiling module 250, according to various embodiments of the present technology. In a first example shown in FIG. 4, the tile generation module 254 can generate a user interface 402 to be presented through a display. As discussed, the display can be the display 210 of the device 200 or a display of a secondary device in communication with the device 200. The tile generation module 254 can size the user interface 402 to match the dimensions of the display. The tile generation module 254 also can determine a first number of tiles for the user interface 402 based on a first number of channels (e.g., n number of channels as shown) detected by the device 200. Each tile has a first tile size that satisfies a threshold tile size. Each tile includes an identification of an associated channel.

Figure 5:
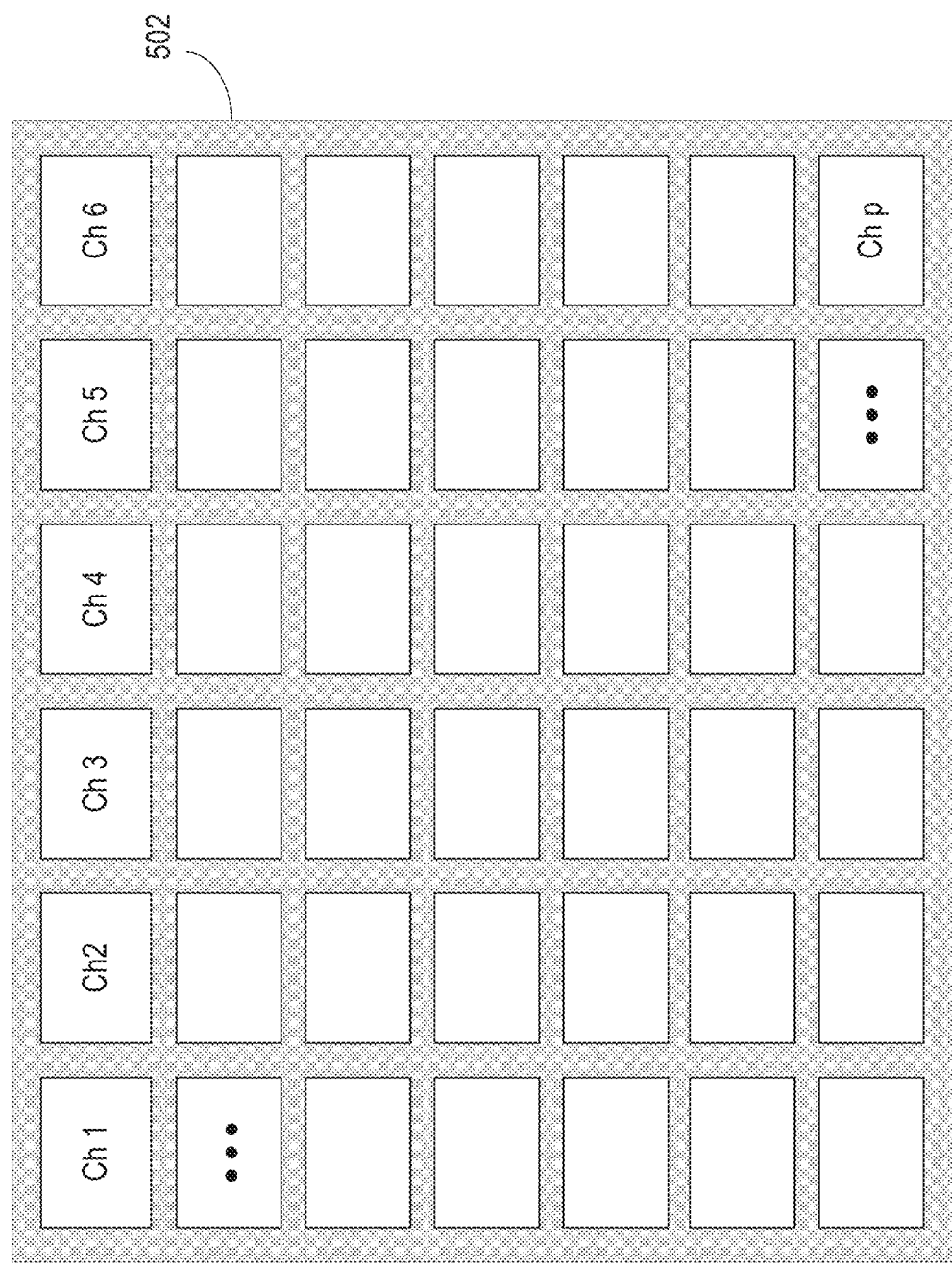

In a second example shown in FIG. 5, the tile generation module 254 can generate a user interface 502 to be presented through the display. The tile generation module 254 can size the user interface 502 to match the size of the display. The tile generation module 254 can determine a second number of tiles for the user interface 502 based on a second number of channels (e.g., p number of channels as shown) detected by the device 200. The second number of channels in this example is larger than the first number of channels in the first example. Each tile has a second tile size that satisfies the threshold tile size. Given the larger number of channels in this example compared to the first example, the second number of tiles in the user interface 502 is larger than the first number of tiles in the user interface 402. Further, given the size of the display, the second tile size of each tile in this example is smaller than the first tile size of each tile in the first example.

Figure 6:
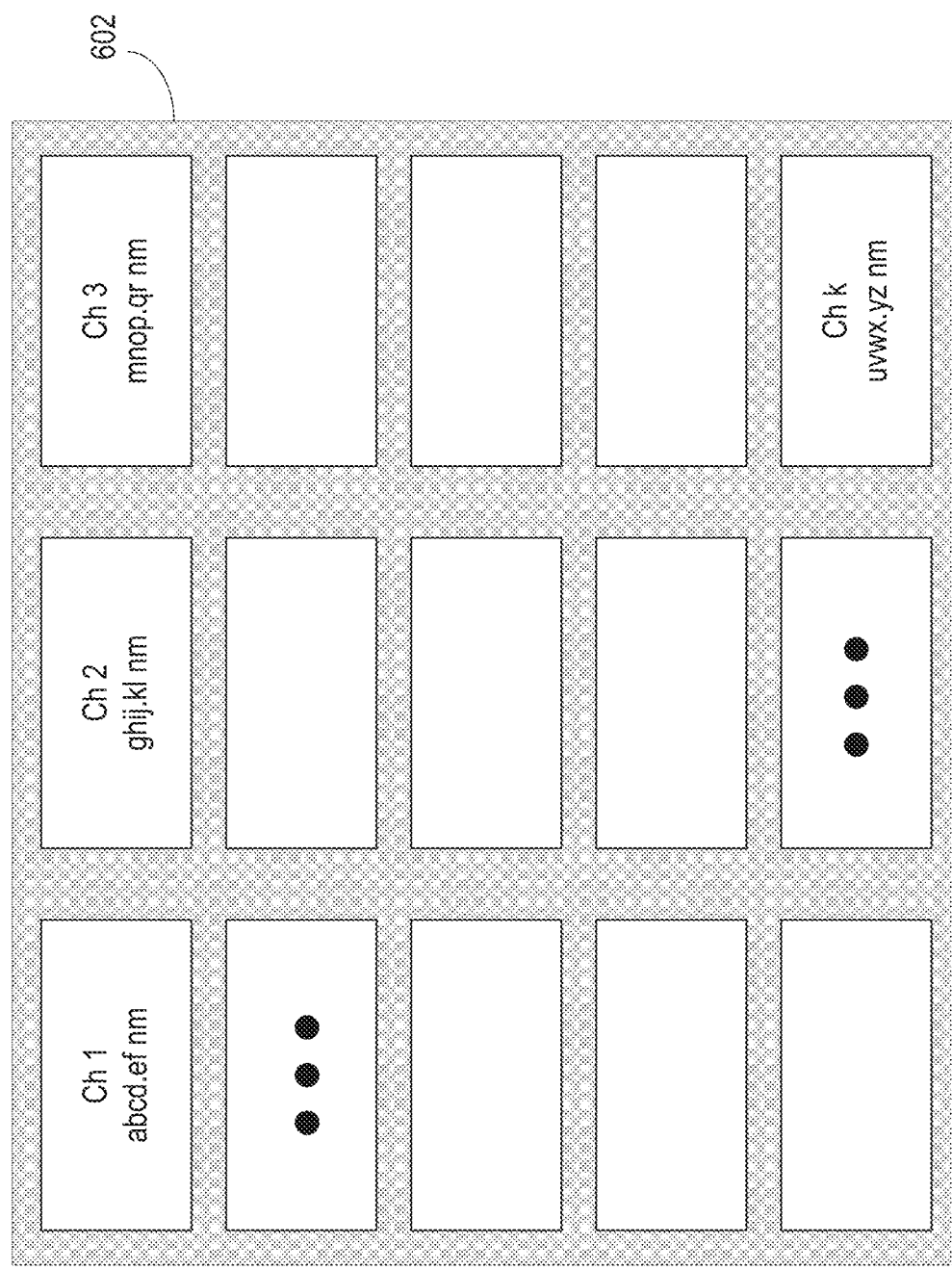

In a third example shown in FIG. 6, the tile generation module 254 can generate a user interface 602 to be presented through the display. The tile generation module 254 can determine a third number of tiles for the user interface 602 based on a third number of channels (e.g., k number of channels as shown) detected by the device 200. The third number of channels in this example is smaller than the first number of channels in the first example. Each tile has a third tile size that satisfies the threshold tile size. The tile generation module 254 can size the user interface 602 to match the size of the display. Given the smaller number of channels in this example, the third number of tiles in the user interface 602 is smaller than the first number of tiles in the user interface 402. Further, given the size of the display, the third tile size of each tile in this example is larger than the first tile size of each tile of the first example. The larger tile size of each tile in this example permits additional information to be contained in the tile. For example, as shown, a tile can indicate a wavelength (in nanometers) of an associated channel along with the identification of the channel.

Figure 7:
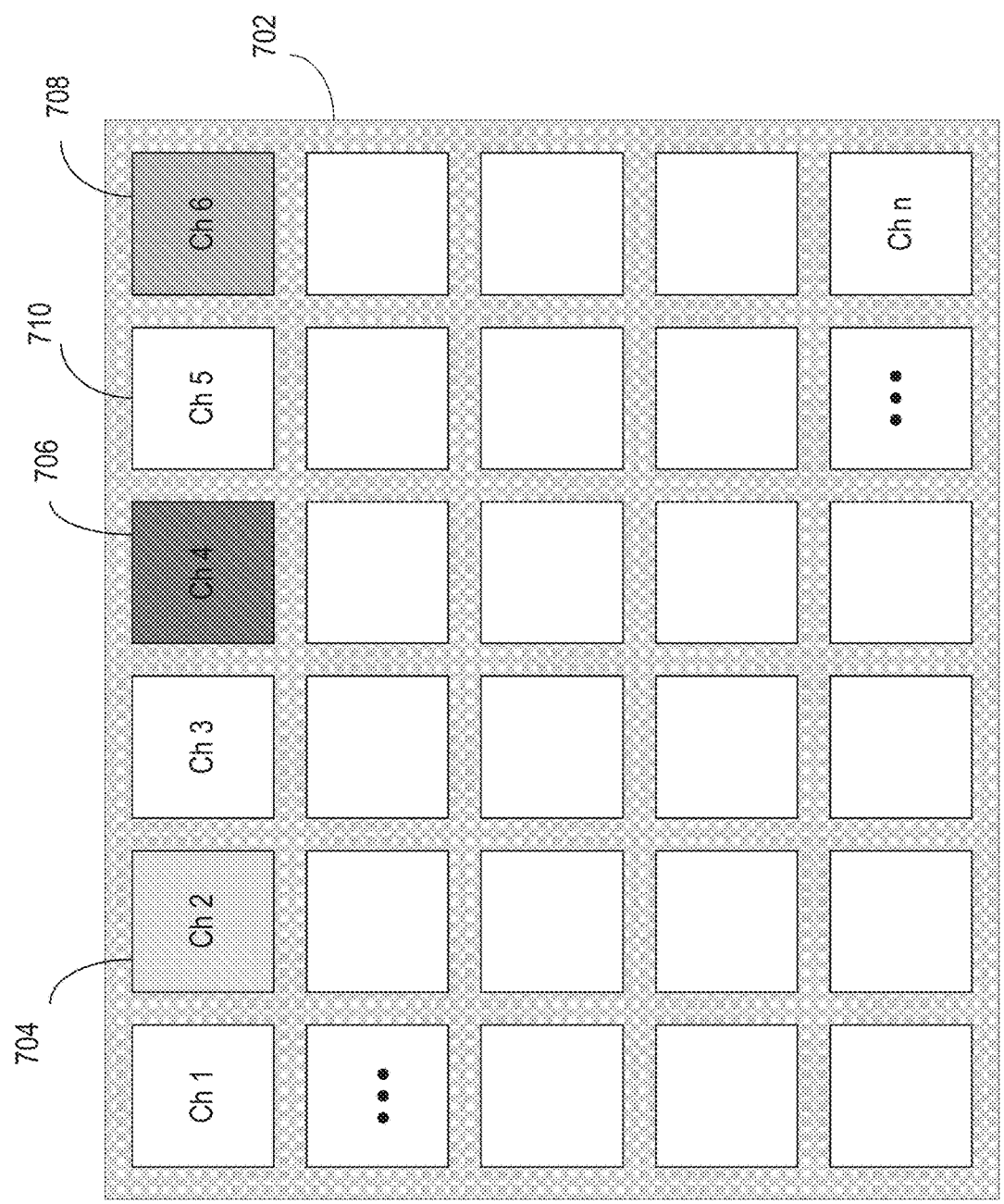

The tile effects module 256 can be configured to vary the appearance or characteristics of tiles to convey information about associated channels. In some embodiments, the tile effects module 256 can stylize tiles to indicate different statuses for associated channels. For example, a tile or portion thereof can contain or reflect a certain color to indicate a status associated with the color. As shown in FIG. 7, a user interface 702 can include tiles with different color coding. In the example shown, a tile 704 that is associated with a first channel can have a first color (e.g., green) to indicate a first status (e.g., good power level) for the first channel. A tile 706 that is associated with a second channel can have a second color (e.g., red) to indicate a second status (e.g., poor power level) for the second channel. A tile 708 that is associated with a third channel can have a third color (e.g., yellow) to indicate a third status (e.g., acceptable power level) for the third channel. A tile 710 that is associated with a fourth channel can have a fourth color (e.g., white) to indicate a fourth status (e.g., no detected power level) for the fourth channel. The number of different colors, the placement of the colors, and the statuses associated with the colors can vary based on preferences and implementation. The use of colors with the tiling can facilitate effective communication of channel conditions.

Figure 8:
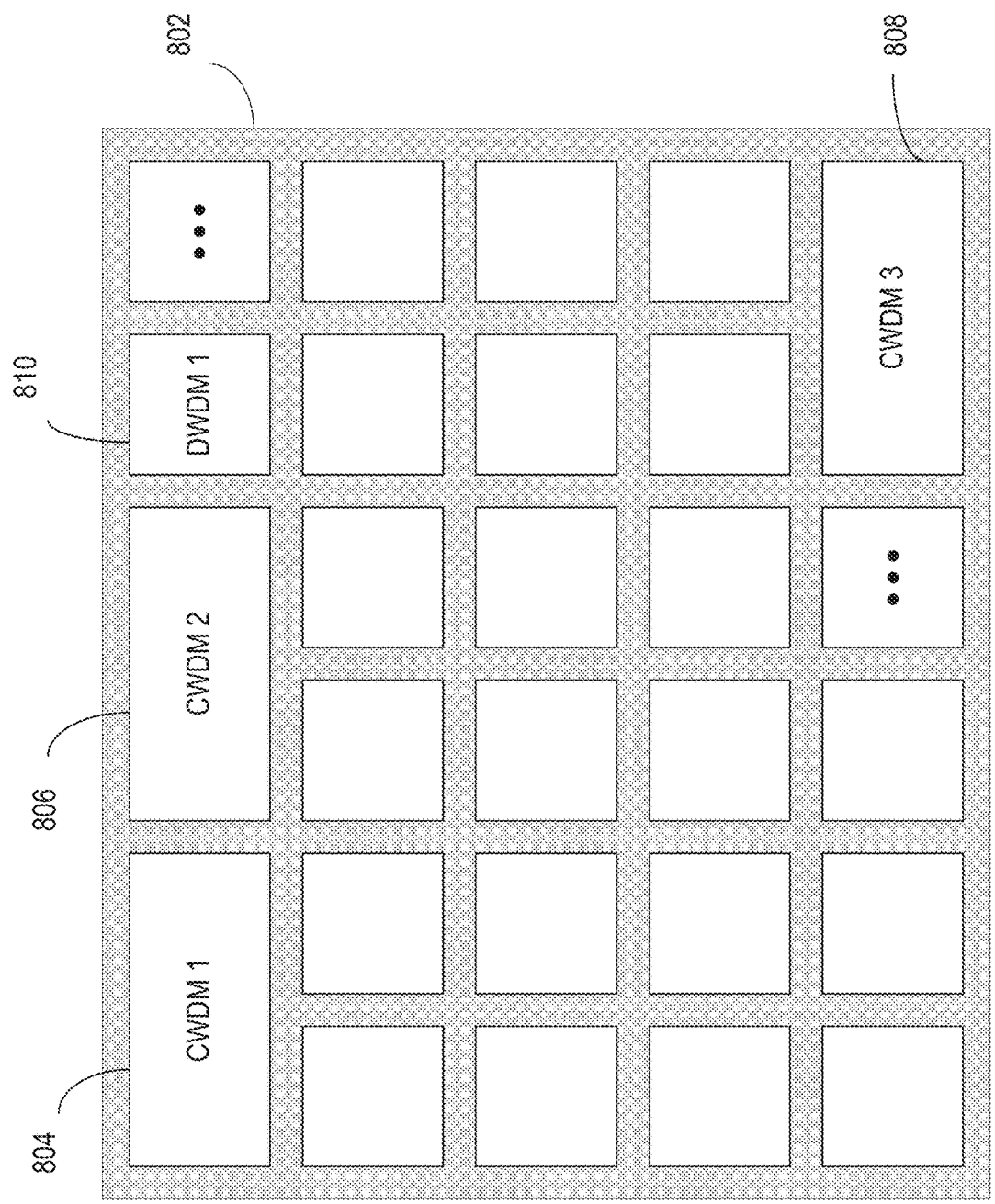

In some embodiments, the tile effects module 256 can be configured to vary the sizes of tiles to reflect channel information. The tile effects module 256 can determine the size of a tile associated with a channel based on the type of the channel. For example, a tile for a first type of channel can have a size that is different from a size of a tile for a second type of channel. As shown in the example of FIG. 8, tiles 804, 806, 808 in a user interface 802 are associated with CWDM channels. A tile 810 is associated with a DWDM channel. The tile effects module 256 generates the tiles 804, 806, 808 to be larger (e.g., wider) than the tile 810 so that an operator viewing the interface 802 can easily distinguish among different channel types. In this example, the wider appearance of tiles associated with a CWDM channel compared to a DWDM channel can reflect the fact that CWDM has wider channel spacing than DWDM. In other embodiments, the size of tiles can vary based on other considerations.

Figure 9:
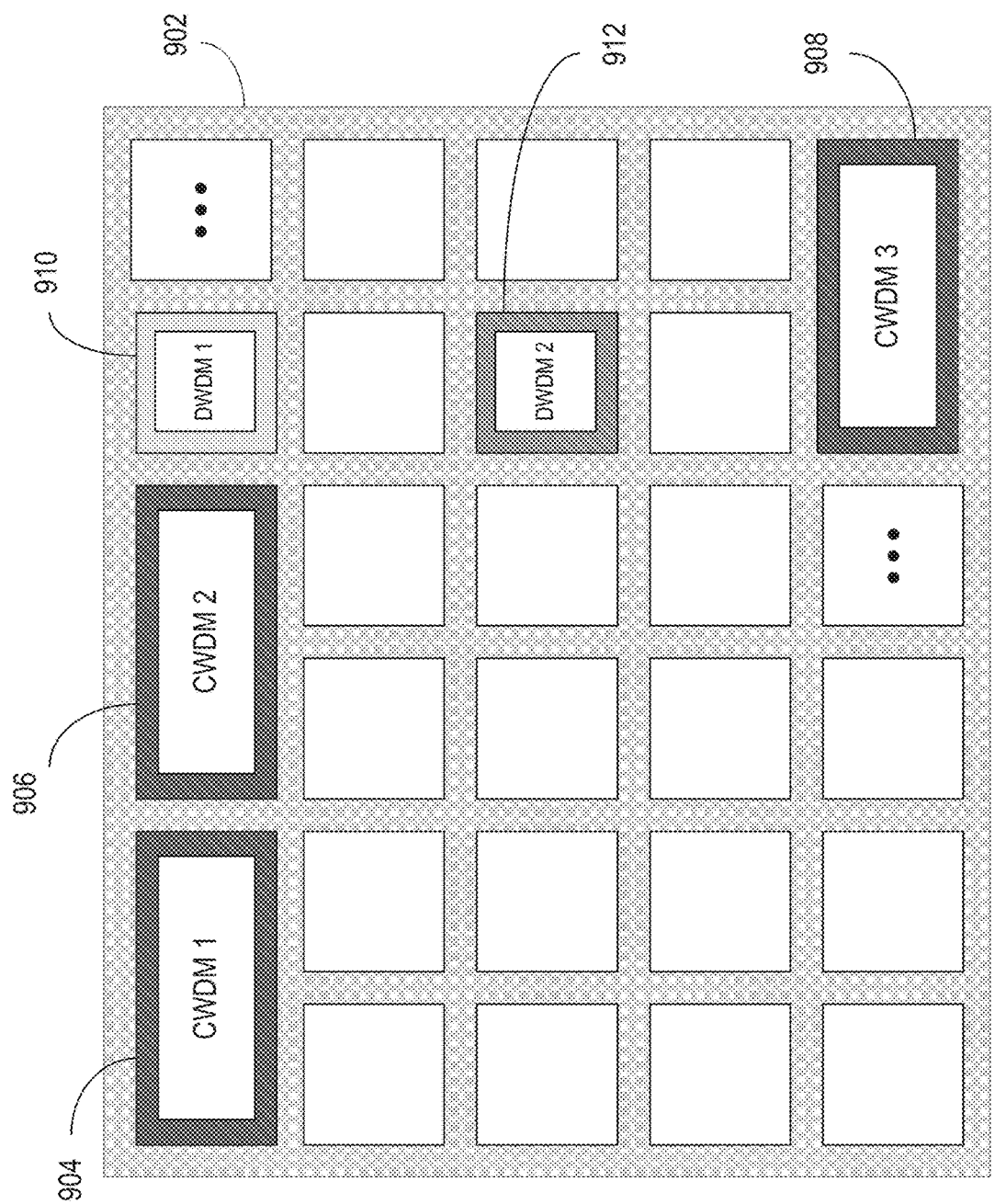

In addition, the tile effects module 256 can further stylize tiles to indicate band information associated with a channel. For example, the tile effects module 256 can include color coding in a tile associated with a channel to indicate a band to which the channel belongs. The color coding of tiles can be performed in a variety of manners. As shown in the example of FIG. 9, tiles 904, 906, 908 in a user interface 902 are associated with three CWDM channels. The tile effects module 256 generates the tiles 904, 906, 908 to include a border having a first color (e.g., blue) to indicate that the three channels are CWDM channels. A tile 910 is associated with a DWDM channel in the C band. The tile effects module 256 generates the tile 910 to include a border having a second color (e.g., brown) to indicate that the DWDM channel is in the C band. A tile 912 is associated with a second DWDM channel in the L band. The tile effects module 256 generates the tile 912 to include a border having a third color (e.g., purple) to indicate that the second DWDM channel is in the L band. While color coding of tile borders are illustrated, other types of color coding of tiles are possible. The tile effects module 256 can generate color coding with tiles to provide a helpful visual indication about relevant channel bands.

Figure 10:
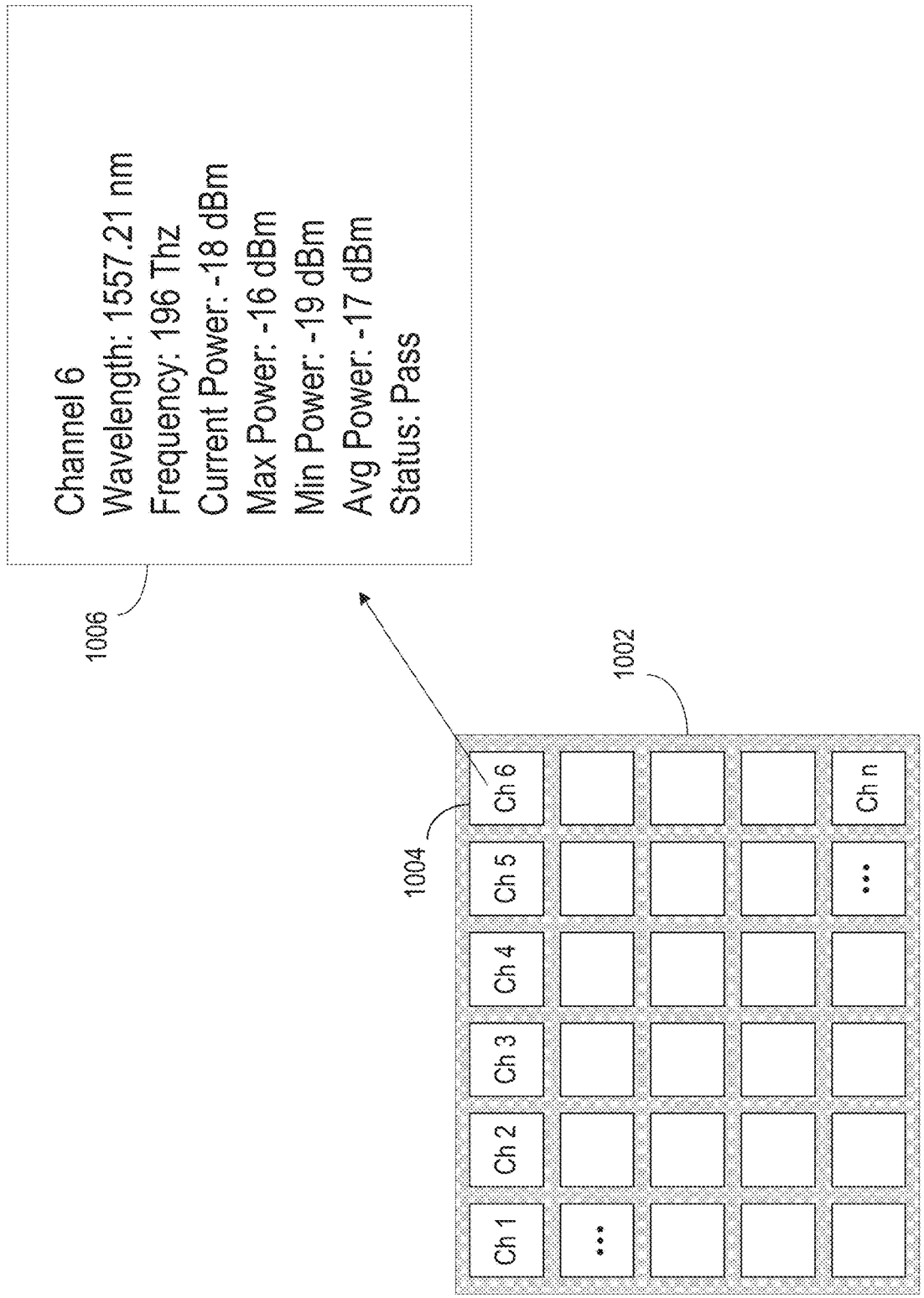

The tile effects module 256 can be configured to provide additional channel information in response to operator interaction with a user interface. In some embodiments, upon a selection of a tile included in a first user interface, the tile effects module 256 can generate a second user interface including additional information about the channel associated with the tile. As shown in the example of FIG. 10, a user interface 1002 includes a tile 1004 associated with a channel. Upon selection of the tile 1004, the tile effects module 256 can generate a second user interface 1006. The second user interface 1006 can include various information about the channel, such as a channel identification, a wavelength, a frequency, current power, maximum power, minimum power, average power, and a status of the channel. Other types of information can be included in the second user interface 1006.

FIG. 11 illustrates an example method 1100, according to various embodiments of the present technology. It should be appreciated that there can be additional, fewer, or alternative steps performed in similar or alternative orders, or in parallel, within the scope of the various embodiments discussed herein unless otherwise stated.

At block 1102, the example method 1100 can determine a number of channels on an optical network. At block 1104, the example method 1100 can determine a size of a display through which a user interface is to be provided. At block 1106, the example method 1100 can determine a number of tiles to be included in the user interface based on the number of channels and the size of the display, wherein each tile is associated with a channel. At block 1108, the example method 1100 can cause the user interface including the number of tiles to be provided through the display. It is contemplated that there can be many other uses, applications, and/or variations associated with the various embodiments of the present technology.

Hardware Implementation

Figure 12:
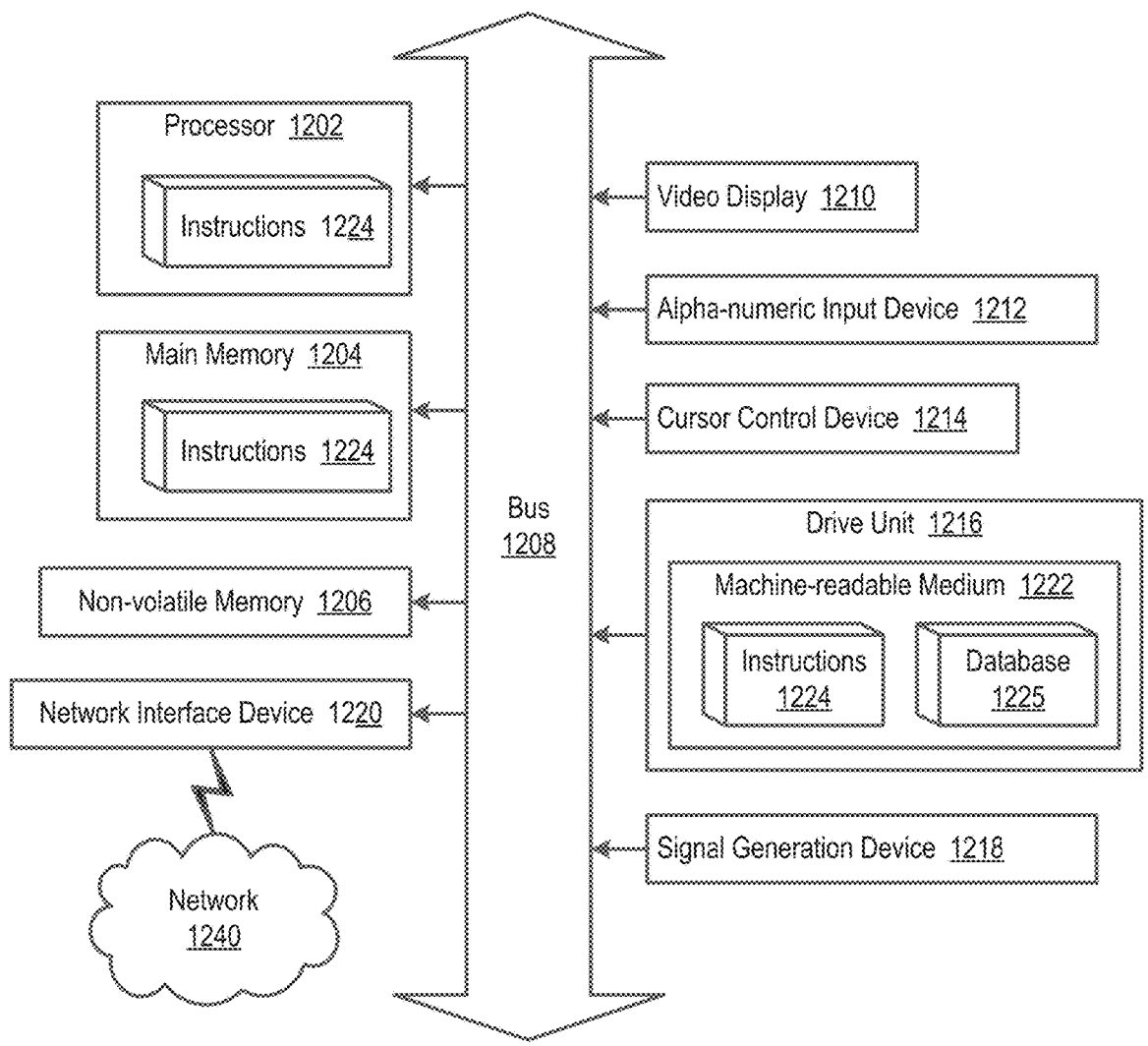
FIG. 12 illustrates an example of a computing system to implement one or more embodiments described herein, according to various embodiments of the present technology.

The foregoing processes and features can be implemented by a wide variety of machine and computing system architectures and in a wide variety of network and computing environments. FIG. 12 illustrates an example of a computing system (or computing device) 1200 that may be used to implement one or more of the embodiments described herein according to various embodiments of the present technology. The computing system 1200 includes sets of instructions 1224 for causing the computing system 1200 to perform the processes and features discussed herein. The computing system 1200 may be connected (e.g., networked) to other machines and/or computer systems. In a networked deployment, the computing system 1200 may operate in the capacity of a server or a client machine in a client-server network environment, or as a peer machine in a peer-to-peer (or distributed) network environment.

The computing system 1200 includes a processor 1202 (e.g., a central processing unit (CPU), a graphics processing unit (GPU), or both), a main memory 1204, and a nonvolatile memory 1206 (e.g., volatile RAM and non-volatile RAM, respectively), which communicate with each other via a bus 1208. In some embodiments, the computing system 1200 can be a desktop computer, a laptop computer, personal digital assistant (PDA), or mobile phone, for example. In one embodiment, the computing system 1200 also includes a video display 1210, an alphanumeric input device 1212 (e.g., a keyboard), a cursor control device 1214 (e.g., a mouse), a drive unit 1216, a signal generation device 1218 (e.g., a speaker) and a network interface device 1220.

In one embodiment, the video display 1210 includes a touch sensitive screen for user input. In one embodiment, the touch sensitive screen is used instead of a keyboard and mouse. The disk drive unit 1216 includes a machine-readable medium 1222 on which is stored one or more sets of instructions 1224 (e.g., software) embodying any one or more of the methodologies or functions described herein. The instructions 1224 can also reside, completely or at least partially, within the main memory 1204 and/or within the processor 1202 during execution thereof by the computing system 1200. The instructions 1224 can further be transmitted or received over a network 1240 via the network interface device 1220. In some embodiments, the machine-readable medium 1222 also includes a database 1225.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1206 may also be a random access memory. The non-volatile memory 1206 can be a local device coupled directly to the rest of the components in the computing system 1200. A non-volatile memory that is remote from the system, such as a network storage device coupled to any of the computer systems described herein through a network interface such as a modem or Ethernet interface, can also be used.

While the machine-readable medium 1222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computing system 1200 to perform any one or more of the processes and features described herein.

In general, routines executed to implement the embodiments of the invention can be implemented as part of an operating system or a specific application, component, program, object, module or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 1200 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a device, a number of channels on an optical network, wherein the device is couplable to the optical network at various locations where field personnel can monitor the optical network and the number of channels is detectable by the device;
determining, by the device, a size of a display through which a user interface is to be provided;
determining, by the device, a number of tiles to be included in the user interface based on the number of channels on the optical network and the size of the display, wherein each tile is associated with a channel;
sizing, by the device, tiles of the number of tiles to be included in the user interface to represent spacing for the number of channels associated with the tiles; and
generating, by the device, the user interface including the number of tiles to be provided through the display;
wherein the user interface comprises a rectangular grid comprising the number of tiles.

2. The computer-implemented method of claim 1, wherein each tile is associated with a CWDM channel or a DWDM channel.

3. The computer-implemented method of claim 1, further comprising determining a size for each tile such that arrangement of the number of tiles in the user interface occupies the area of the user interface based on a threshold value.

4. The computer-implemented method of claim 1, wherein the tiles are the same size.

5. The computer-implemented method of claim 1, wherein the user interface includes a tile having stylization, the stylization including a color to indicate a status of a channel associated with the tile, the status associated with a power level range into which a power level value of the channel falls.

6. The computer-implemented method of claim 1, wherein the user interface includes a tile having stylization, the stylization including a color to indicate a band to which the channel belongs.

7. The computer-implemented method of claim 1, further comprising, in response to selection of a tile included in the user interface, providing channel information about a channel associated the tile in a second user interface, the channel information including at least one of a channel identification, wavelength, frequency, current power, maximum power, minimum power, average power, or status of the channel.

8. The computer-implemented method of claim 1, wherein the determining a number of tiles to be included in the user interface is further based on a configuration selected by an operator of the device.

9. The computer-implemented method of claim 1, wherein the display is associated with the device or a second device in communication with the device.

10. The computer-implemented method of claim 1, wherein the detecting is based on demultiplexing by the device a signal of the optical network.

11. A system comprising:
at least one processor; and
a memory storing instructions that, when executed by the at least one processor, cause the system to perform:
determining a number of channels on an optical network, wherein the system is couplable to the optical network at various locations where field personnel can monitor the optical network and the number of channels is detectable by the system;
determining a size of a display through which a user interface is to be provided;
determining a number of tiles to be included in the user interface based on the number of channels on the optical network and the size of the display, wherein each tile is associated with a channel;
sizing, by the device, tiles of the number of tiles to be included in the user interface to represent spacing for the number of channels associated with the tiles; and
generating the user interface including the number of tiles to be provided through the display;
wherein the user interface comprises a rectangular grid comprising the number of tiles.

12. The system of claim 11, wherein each tile is associated with a CWDM channel or a DWDM channel.

13. The system of claim 11, wherein a first tile associated with a first type of channel has a first size and a second tile associated with a second type of channel has a second size different from the first size.

14. The system of claim 11, wherein the user interface includes a tile having stylization, the stylization including a color to indicate a status of a channel associated with the tile, the status associated with a power level range into which a power level value of the channel falls.

15. The system of claim 11, wherein the user interface includes a tile having stylization, the stylization including a color to indicate a band to which the channel belongs.

16. The system of claim 11, wherein the detecting is based on demultiplexing by the system a signal of the optical network.

17. A non-transitory computer-readable storage medium including instructions that, when executed by at least one processor of a computing system, cause the computing system to perform:
determining a number of channels on an optical network, wherein the computing system is couplable to the optical network at various locations where field personnel can monitor the optical network and the number of channels is detectable by the computing system;
determining a size of a display through which a user interface is to be provided;
determining a number of tiles to be included in the user interface based on the number of channels on the optical network and the size of the display, wherein each tile is associated with a channel;
sizing, by the device, tiles of the number of tiles to be included in the user interface to represent spacing for the number of channels associated with the tiles; and
generating the user interface including the number of tiles to be provided through the display;
wherein the user interface comprises a rectangular grid comprising the number of tiles.

18. The non-transitory computer-readable storage medium of claim 17, wherein each tile is associated with a CWDM channel or a DWDM channel.

19. The non-transitory computer-readable storage medium of claim 17, wherein a first tile associated with a first type of channel has a first size and a second tile associated with a second type of channel has a second size different from the first size.

20. The non-transitory computer-readable storage medium of claim 17, wherein the user interface includes a tile having stylization, the stylization including a color to indicate a status of a channel associated with the tile, the status associated with a power level range into which a power level value of the channel falls.

* * * * *